United States Patent
Takahashi et al.

(10) Patent No.: US 6,903,786 B2
(45) Date of Patent: Jun. 7, 2005

(54) LIQUID CRYSTAL DISPLAY DEVICE, MANUFACTURING METHOD THEREOF, AND FABRICATION APPARATUS THEREFOR

(75) Inventors: Tomoaki Takahashi, Mobara (JP); Sakari Kaneku, Mobara (JP); Hideaki Yamamoto, Tokorozawa (JP); Mitsuo Nakatani, Mobara (JP); Hiroshi Sasaki, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/865,779

(22) Filed: Jun. 14, 2004

(65) Prior Publication Data

US 2004/0223090 A1 Nov. 11, 2004

Related U.S. Application Data

(62) Division of application No. 09/951,425, filed on Sep. 14, 2001, now abandoned.

(30) Foreign Application Priority Data

Sep. 14, 2000 (JP) ........................................ 2000-279607

(51) Int. Cl.$^7$ ............................................. G02F 1/1343
(52) U.S. Cl. ........................................ 349/38; 349/147
(58) Field of Search ........................... 349/38, 39, 147, 349/148, 149; 438/30; 257/59, 72

(56) References Cited

U.S. PATENT DOCUMENTS

| | | | |
|---|---|---|---|
| 5,162,933 A | 11/1992 | Kakuda et al. | |
| 5,541,748 A | 7/1996 | Ono et al. | |
| 5,781,255 A | 7/1998 | Yamamoto et al. | |
| 5,811,835 A * | 9/1998 | Seiki et al. | 257/57 |
| 5,994,156 A * | 11/1999 | Voutsas et al. | 438/30 |
| 6,081,308 A * | 6/2000 | Jeong et al. | 349/42 |
| 6,133,977 A | 10/2000 | Lee et al. | |
| 6,190,934 B1 | 2/2001 | Kang et al. | |
| 6,333,518 B1 * | 12/2001 | Seo | 257/72 |
| 6,433,842 B1 * | 8/2002 | Kaneko et al. | 349/43 |
| 6,522,370 B2 * | 2/2003 | Takahashi et al. | 349/43 |

* cited by examiner

Primary Examiner—Tarifur R. Chowdhury
Assistant Examiner—David Chung
(74) Attorney, Agent, or Firm—Antonelli, Terry, Stout & Kraus, LLP

(57) ABSTRACT

A method of manufacturing an LCD device which includes a gate line having an effective display area which includes an aluminum alloy layer and an aluminum oxide layer. The gate line also includes a gate terminal portion which is made up of the same aluminum alloy layer with a molybdenum alloy layer formed thereon. To form this structure, an insulating substrate of the LCD device, with the laminated structure of the aluminum alloy layer and the molybdenum layer, is immersed in an electrolytic solution. During the immersion, the molybdenum layer is etched off the aluminum alloy in the effective displaying area, while the etching is prevented in the gate terminal area by a protective layer. Following this, the aluminum oxide layer is formed over the aluminum alloy in the effected display area while the device is still immersed in the electrolytic solution.

17 Claims, 12 Drawing Sheets

(Gate Terminal Portion)  (Effective Displaying Area/Gate Wiring Portion)

(Thin Film Transistor Portion) TFT   (Additional Capacitance Portion) Cadd (Drain Line Terminal Portion)

(Gate Terminal Portion) (Effective Displaying Area/Gate Wiring Portion)

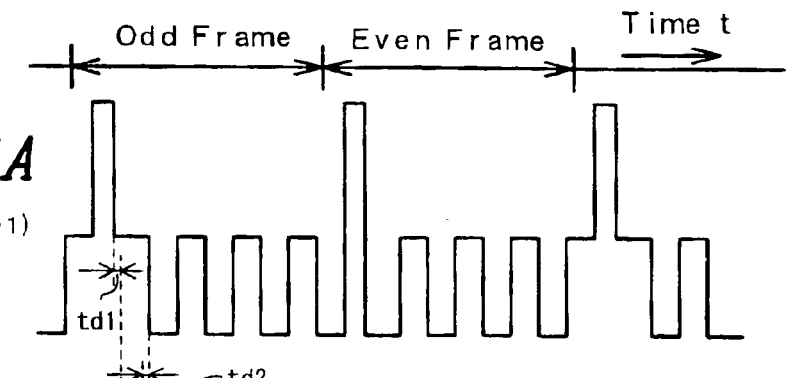
FIG. 14A  $V_{G(i-1)}$
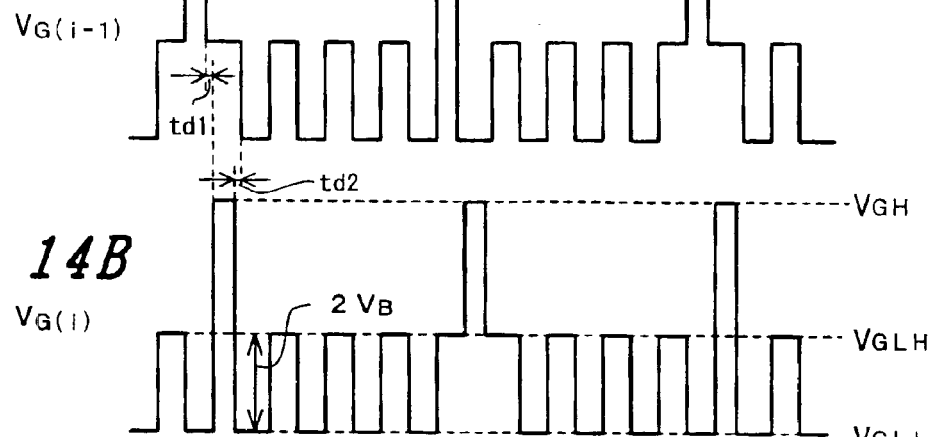
FIG. 14B  $V_{G(i)}$
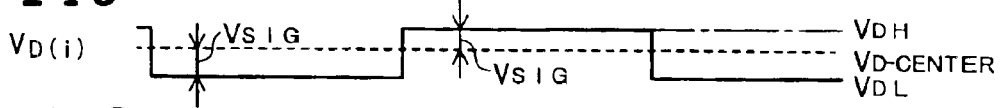
FIG. 14C  $V_{D(i)}$
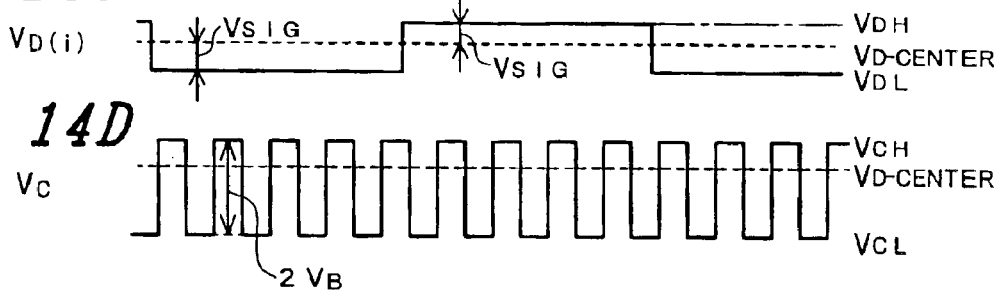
FIG. 14D  $V_C$
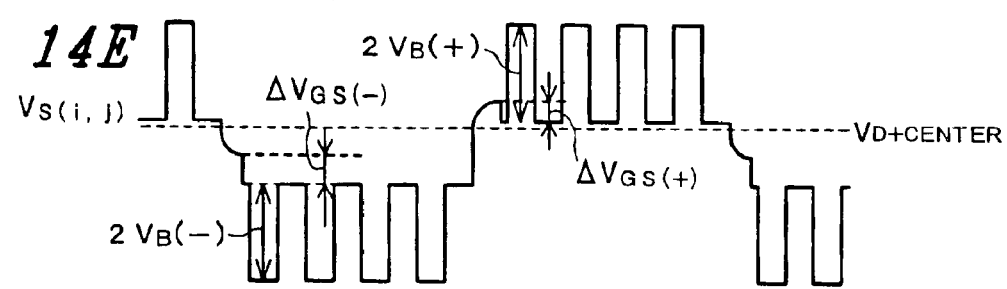
FIG. 14E  $V_{S(i,j)}$
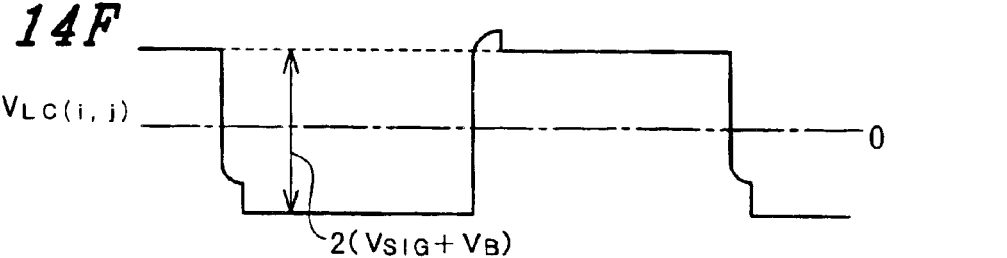
FIG. 14F  $V_{LC(i,j)}$

LIQUID CRYSTAL DISPLAY DEVICE, MANUFACTURING METHOD THEREOF, AND FABRICATION APPARATUS THEREFOR

CROSS-REFERENCE TO RELATED APPLICATIONS

This application is a Divisional application of Application Ser. No. 09/951,425, filed Sep. 14, 2001 now abandoned, the entire disclosure of which is hereby incorporated by reference.

BACKGROUND OF THE INVENTION

1. Field of the Invention

The present invention is related to a liquid crystal display device, particularly to a liquid crystal display device disposing a pair of insulating substrates opposite to one another with a predetermined gap by interposing spacers therebetween, holding liquid crystal compounds, and having an additional capacitance portion formed in a pixel area, a manufacturing method of the liquid crystal display device, and a fabrication apparatus for the liquid crystal display device.

2. Description of the Related Art

High-resolution liquid crystal display devices capable of color display for notebook-sized computers and computer monitors are spread widely.

Those liquid crystal display devices are generally classified into a passive matrix type in which what is called a liquid crystal panel is formed by interposing a liquid crystal compound layer (hereinafter also referred to simply as "liquid crystal") between two insulating substrates at least one of which is a transparent glass plate or the like and pixels are formed by applying voltages selectively to various pixel forming electrodes formed on the insulating substrates of the liquid crystal panel and thereby changing the alignment direction of liquid crystal molecules in each desired pixel portion, and an active matrix type in which various electrodes as mentioned above and active elements for pixel selection are formed and pixels are formed by changing the alignment direction of liquid crystal molecules in each desired pixel portion by selecting part of the active elements.

In general, active matrix liquid crystal display devices employ what is called a vertical electric field scheme (also called a TN (twisted nematic) scheme) in which electric fields for changing the alignment direction of the liquid crystal are applied between an electrode formed on one substrate and electrodes formed on the other substrate.

On the other hand, liquid crystal display devices employing what is called a lateral electric field scheme (also called an IPS (in-plane switching) scheme) have been put in practical use in which the directions of electric fields applied to the liquid crystal are approximately parallel with the substrate surfaces. For example, a liquid crystal display device of the lateral electric field scheme is known in which comb-tooth electrodes etc. for electric field formation are formed on one of the two insulating substrates, whereby a very wide viewing angle is obtained.

In a liquid crystal display device of the lateral electric field scheme, a plurality of scanning signal lines (hereinafter referred to as "gate lines") and video signal lines (hereinafter referred to as "drain lines"), switching elements formed in the vicinity of crossing points of the gate lines and the drain lines, pixel electrodes to which drive voltages are applied via the respective switching elements, and counter voltage signal lines (hereinafter referred to as counter electrodes) are formed in an active matrix substrate (also called "thin-film transistor substrate"). Color filter layers are formed in a color filter substrate so as to correspond to respective pixels that are formed in aperture regions of a black matrix that is made of a resin composition. A liquid crystal panel is formed by interposing a liquid crystal between the active matrix substrate and the color filter substrate. The liquid crystal display device is constructed by disposing a backlight behind the liquid crystal panel and integrating them using top and bottom cases.

Image display is performed by varying the light transmittance of the liquid crystal by means of electric field components that are formed between the pixel electrodes and the counter electrodes and are approximately parallel with the surfaces of the insulating substrates.

In contrast to the case of the vertical electric field scheme, such a liquid crystal display device of the lateral electric field scheme provides a clear image even when viewed from a large viewing angle with respect to the display surface (a large inclination from a normal to the display surface). Hence, the liquid crystal display device of the lateral electric field scheme hence is superior in so-called viewing angle characteristic.

For example, Japanese Unexamined Patent Publication No. Hei. 6-160878 and its counterpart U.S. Pat. No. 5,598, 285 discloses a liquid crystal display device having such a configuration.

FIG. 17 is a plan view showing one pixel, an associated light shield region of a black matrix, and its peripheral region of an exemplary liquid crystal display device of the lateral electric field scheme. Each pixel is formed in a region enclosed by four signal lines, that is, a gate line GL, a counter voltage signal line CL, and two adjacent drain lines DL.

Each pixel includes a thin-film transistor TFT as a switching element, a storage capacitance portion Cadd, a pixel electrode PX, and counter electrodes CT. A plurality of gate lines GL and a plurality of counter voltage signal lines CL extend in the right-left direction and are arranged in the top-bottom direction in FIG. 17. A plurality of drain lines DL extend in the top-bottom direction and are arranged in the right-left direction in FIG. 17. Each pixel electrode PX is connected to the associated thin-film transistors TFT and each counter voltage signal line CL is integral the associated counter electrodes CT. Each thin-film transistor TFT is formed by the associated gate line GL as a gate electrode, a drain electrode that is formed on a semiconductor layer AS formed on the gate line GL and extends from the associated drain line DL, and a source electrode that is connected to the associated pixel electrode PX.

Each pixel electrode PX is opposed to the associated counter electrodes CT. Display is controlled by modulating transmission light or reflection light by controlling the alignment state of the liquid crystal by electric fields developing between each pixel electrode PX and the associated counter electrodes CT. The pixel electrodes PX and the counter electrodes CT are long and narrow electrodes extending in the top-bottom direction in FIG. 17 and assume comb-tooth shapes.

The potential of each counter electrode CT is stable because it is supplied externally via the associated counter voltage signal line CL. Therefore, almost no potential variation occurs in each counter electrode CT though it is adjacent to a drain line DL. Further, because of the presence of counter electrodes CT, each pixel electrode PX is geometrically distant from the adjacent drain lines DL, whereby the parasitic capacitance between those electrodes is decreased to a large extent. This makes it possible to control a variation of the pixel electrode potential due to video signal voltages.

As a result, crosstalk (i.e., an image quality defect called "vertical smear") in the top-bottom direction can be suppressed.

A specific example is as follows. The widths of the pixel electrodes PX and the counter electrodes CT are set at 6 μm, which is sufficiently greater than 4.5 μm, which itself is greater than a maximum setting thickness of the liquid crystal (described later). It is desirable that the widths of the pixel electrodes PX and the counter electrodes CT be set sufficiently greater than 5.4 μm because it is preferable to secure a margin of 20% or more in consideration of processing variations in manufacture.

With the above measure, electric field components applied to the liquid crystal that are parallel with the substrate surfaces become larger than electric field components in the vertical direction, which makes it possible to prevent undue increase of voltages for driving the liquid crystal. It is preferable that the maximum values of the widths of the various kinds of electrodes be smaller than the interval L between each pixel electrode PX and the counter electrodes CT associated therewith.

This is for the following reason. If the electrode interval L is too small, electric field lines are curved very much and electric field components that are perpendicular to the surfaces of the insulating substrates are larger than those parallel with the substrate surfaces. Therefore, the electric field components parallel with the substrate surfaces cannot be applied efficiently to the liquid crystal.

To prevent disconnection, the width of the drain lines DL is set a little greater than the widths of the pixel electrodes PX and the counter electrodes CT. To prevent short-circuiting between each counter electrode CT and the drain line DL adjacent to it, the interval between them is set at about 1 μm. Further, the drain lines DL and the counter electrodes CT are formed in different layers in such a manner that the drain lines DL are formed above a gate insulating film that covers the gate lines GL and the counter electrodes CT are formed below the gate insulating film.

On the other hand, for the following reason, the interval L between each pixel electrode PX and the associated counter electrodes CT is changed in accordance with the liquid crystal material used. The electric field strength that attains maximum transmittance depends on the liquid crystal material. Therefore, the electrode interval L is set in accordance with the liquid crystal material so that maximum transmittance can be obtained in a range defined by a maximum amplitude of a signal voltage that is set in accordance with a breakdown voltage of a video signal driving circuit (signal-side driver) used. With a liquid crystal material described later, the electrode interval L is set at about 15 μm.

In the liquid crystal display device being considered, the black matrix BM formed on the color filter substrate (not shown) seems to be located above the gate lines GL, the counter voltage signal lines CL, the thin-film transistors TFT, and the drain lines DL, and an aperture periphery of the black matrix BM formed seems to reveal that gaps between the drain line DL and the counter electrodes CT in a plan view.

Outside each aperture periphery of the black matrix BM (i.e., outside each pixel region), each additional capacitor Cadd is formed by the associated pixel electrode PX and counter voltage signal line CL and an insulating film formed in between.

SUMMARY OF THE INVENTION

Particularly in liquid crystal display devices of the IPS scheme, there may occur what is called "spot contamination" that are a phenomenon of deteriorating display quality. It is considered that spot contamination occurs in such a manner that the electrode wiring material of the gate lines, the drain lines, the counter voltage signal lines, etc. that are formed in the thin-film transistor substrate oozes and soaks into the liquid crystal and changes the characteristics of the liquid crystal.

It has been pointed out that spot contamination tends to occur near gate lines.

In the conventional liquid crystal display device described above, in many cases the gate lines formed on the thin-film transistor substrate (insulating substrate) are conductive thin films of chromium (Cr), aluminum (Al), tantalum (Ta), or the like or an alloy thereof.

In particular, in view of the material cost, the processability in manufacture of the liquid crystal display device, and the resistance (lower resistance is preferable), at present aluminum and its alloys are suitable for a wiring material.

Japanese Patent Application No. Hei. 1-207792 (and its counterpart U.S. Pat. No. 5,359,206) proposes a technique to prevent short-circuiting between gate lines and drain lines that cross over the gate lines in a thin-film transistor substrate, the surfaces of the gate lines made of aluminum of an aluminum alloy is covered with an aluminum oxide film that is formed by anodic oxidation.

FIG. 18 is a sectional view of a main part of this conventional thin-film transistor substrate and shows the structure of a gate line. This thin-film transistor substrate has a gate line GL being a thin film of an aluminum alloy formed on a substrate SUB1, and a gate terminal GTM is provided with a thin film of chromium formed at an end of the gate line GL. An anodic oxidation film AOF is formed on the surface of the gate line GL.

An insulating film SIN and a passivation film PAS are formed in an area excluding most of the gate terminal GTM. A transparent conductive film ITO is formed on a portion of the gate terminal GTM where the insulating film SIN and the passivation film PAS are not formed. The thin-film transistor substrate having the above structure is produced by the following process.

A thin film g1 of an aluminum alloy is formed on a glass substrate (insulating substrate) SUB1 and then subjected to photoetching, whereby a lower-layer conductive film of a gate line GL is formed. A chromium thin film g2 is formed on the lower-layer conductive film and then subjected to photoetching, whereby a gate terminal GTM is formed.

After the chromium thin film g2 (gate terminal GTM) is covered with a photoresist, an aluminum oxide ($Al_2O_3$) film AOF is formed by anodizing the surface of the aluminum alloy thin film g1 to complete the gate line GL.

An insulating layer (SiN film) SIN and an amorphous semiconductor layer (a-Si film) ASI are formed on the aluminum oxide film AOF by plasma CVD and an island of a thin-film transistor TFT is formed by patterning thereof.

Then, a transparent electrode of ITO (indium tin oxide) is formed and patterned by photoetching. In the gate terminal portion, part of the chromium thin film g2 is left on the aluminum alloy thin film g1, at this step.

Japanese Unexamined Patent Publication No. Hei. 4-273480 discloses another method for forming aluminum oxide films by anodic oxidation in which a masking device is used. The apparatus disclosed by this publication has a donut-shaped mask member that is hollow inside and can be evacuated. A thin-film transistor substrate is vacuum-attracted in such a manner that its effective displaying area is exposed. Anodic oxidation is performed in such a manner that wiring regions of a gate terminal portion are masked and a device portion in the thin-film transistor substrate other than the portion masked by the mask member is filled with an anodizing liquid.

However, the above conventional techniques have the following three problems:
(1) In many cases, an ITO film that is an anticorrosion conductive film is used as the uppermost layer of a gate terminal portion. However, an ITO film has a property that it exhibits large contact resistance when it is in contact with an aluminum alloy thin film. Therefore, it is necessary to form a terminal with a chromium thin film that provides good contact with both of the ITO film and the aluminum alloy thin film. Since gate lines and gate terminals are formed with different materials, the number of manufacturing steps increases.
(2) To form gate lines and gate terminals, three photolithography steps are needed: patterning of an aluminum alloy thin film, patterning of a chromium thin film to form gate terminals, and patterning of an anodic oxidation resist.
(3) There is a bare possibility that eddy current flows through the boundary between the masking device and the substrate in performing anodic oxidation while masking the wiring regions. The eddy current may form holes in wiring lines.

An object of the present invention is to provide a liquid crystal display device capable of high-quality image display by solving the above problems in the art as well as a manufacturing method of a liquid crystal display device free of spot contamination without increasing the number of manufacturing steps for patterning of electrode wiring thereof.

To attain the above object, according to the invention, a lamination film of an aluminum alloy thin film and a molybdenum alloy thin film is used as electrode wiring such as gate lines, drain lines, and counter voltage signal lines, the molybdenum alloy thin film of each lamination film in an effective displaying area in which thin-film transistors are arranged is removed by etching, and the surface of each aluminum alloy thin film that is exposed after the removal of the associated molybdenum alloy thin film is anodized so as to be coated with an anodic oxide film. The steps of the etching of each molybdenum alloy thin film and the anodic oxidation are executed continuously.

The molybdenum alloy thin film constituting each lamination film outside the effective displaying area, that is, the lead portion (terminal portion) of each of the gate lines, drain lines, counter voltage signal lines, etc. is left as it is. Further, the above wiring patterning step is facilitated by using a manufacturing apparatus having a novel configuration.

The invention can be applied to not only various kinds of wiring lines and electrodes of a thin-film transistor liquid crystal display device but also other similar semiconductor devices.

The invention is not limited to the aforementioned scopes nor the following embodiments and various modifications are possible without deviation from the gist of the invention.

These and other objects, features and advantages of the present invention will become more apparent from the following description when taken in conjunction with the accompanying drawings.

BRIEF DESCRIPTION OF THE DRAWINGS

FIGS. 14A–14F show exemplary drive waveforms of a liquid crystal display device according to the invention;

DETAILED DESCRIPTION

Embodiments in which the present invention is applied to a gate wiring portion and a gate terminal portion of a thin-film transistor substrate of a thin-film transistor type liquid crystal display device will be hereinafter described in detail with reference to the accompanying drawings.

Figure 1:
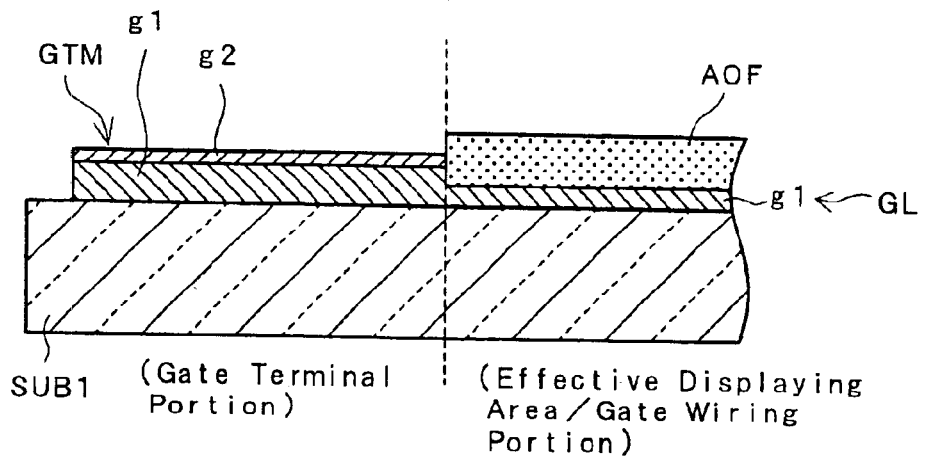
FIG. 1 is a sectional view of a main part of a thin-film transistor substrate according to a first embodiment of the present invention and schematically shows the structure of the thin-film transistor substrate.

FIG. 1 is a sectional view of an important part of a thin-film transistor substrate according to a first embodiment of the invention and schematically shows the structure of the thin-film transistor substrate. In FIG. 1, reference symbol SUB1 denotes a substrate called as the thin-film transistor substrate, and a transparent glass substrate is utilized therefor in this embodiment.

Figure 17:
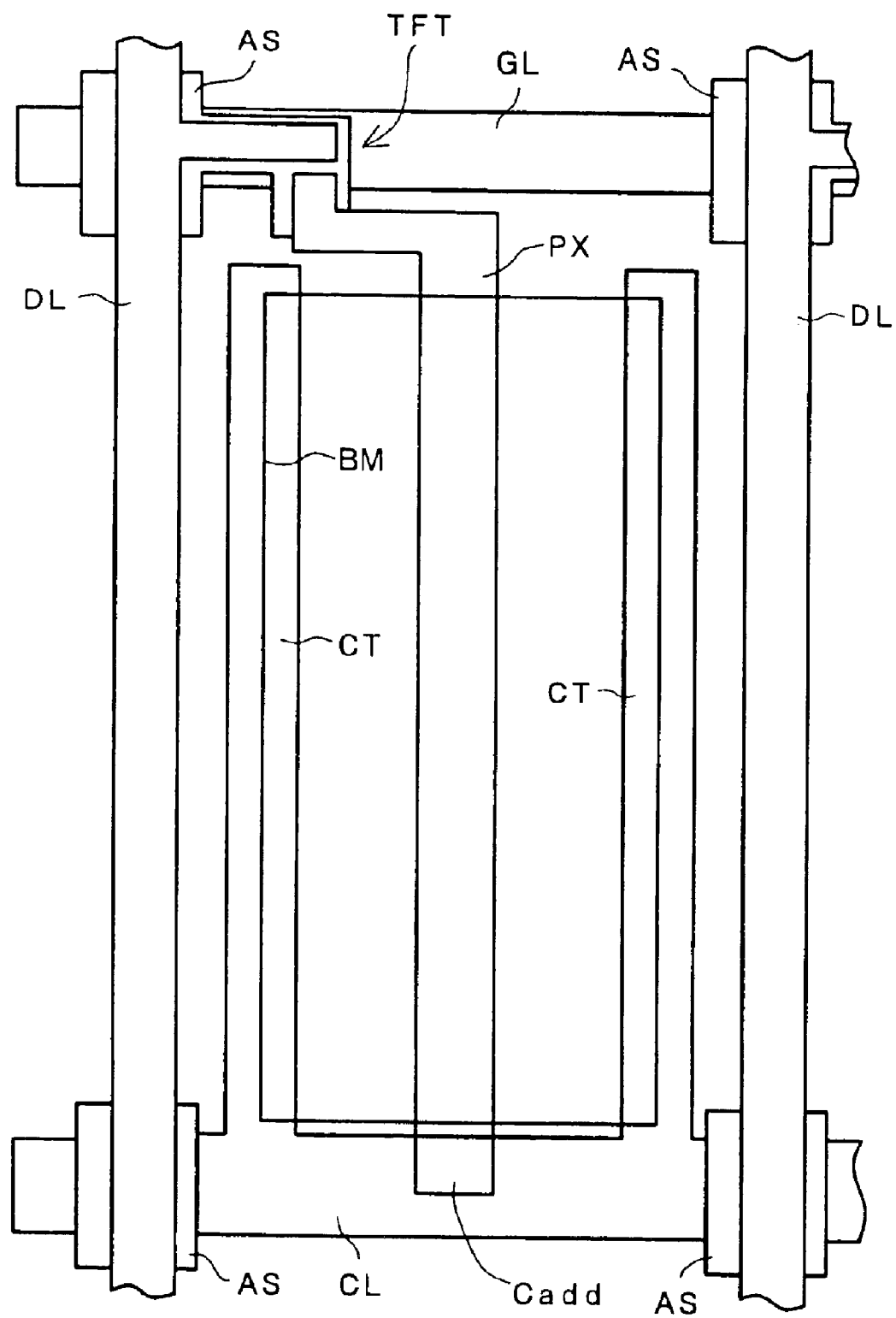
FIG. 17 is a plan view showing one pixel, an associated light shield region of a black matrix, and its peripheral region of an exemplary liquid crystal display device of the lateral electric field scheme.
Figure 18:
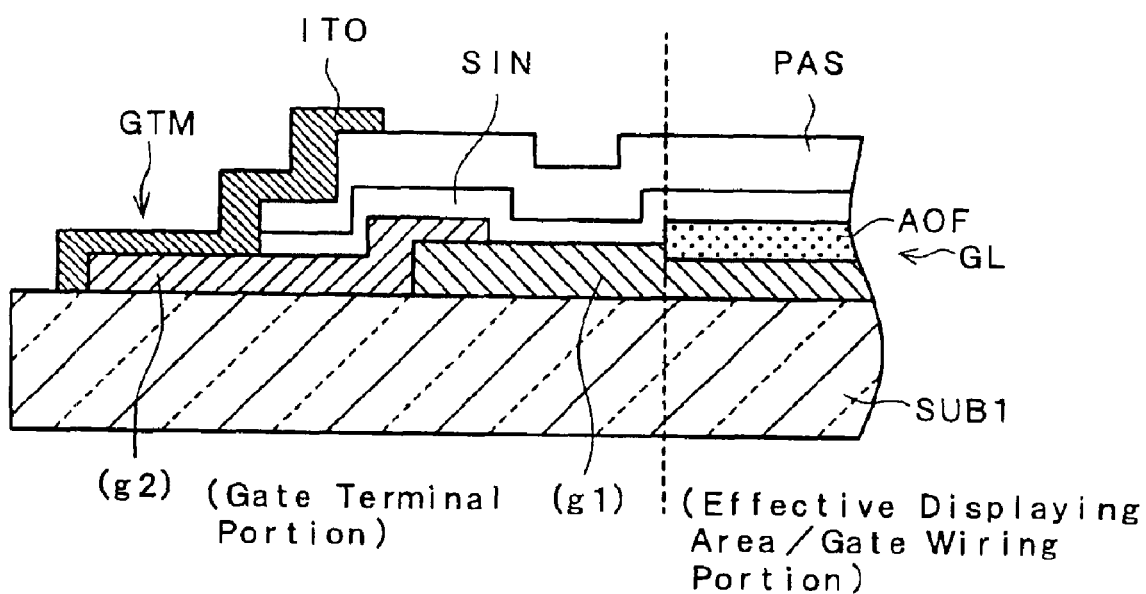
FIG. 18 is a sectional view of an important part of a conventional thin-film transistor substrate and shows the structure of a gate line.

An effective displaying area/gate wiring portion in which a number of pixels as described above with reference to FIG. 17 are arranged and a gate terminal portion for leading out the gate lines in the gate wiring portion are formed on the substrate SUB1. In FIG. 1, the two portions are divided by a vertical broken line.

Each gate line GL in the effective displaying area (gate wiring portion) is formed by removing a top-layer molybdenum alloy thin film g2 from a lamination film of an aluminum alloy thin film g1 and the molybdenum alloy thin film g2 and then forming an aluminum anodic oxidation film AOF (aluminum oxide ($Al_2O_3$) film) on the exposed surface of the aluminum alloy thin film g1.

That is, no molybdenum alloy thin films g2 exist in the effective displaying area and each gate terminal GTM is a lamination film of an aluminum alloy thin film g1 and a molybdenum alloy thin film g2.

The thin-film transistor substrate is constructed by forming, in the gate wiring portion, various structural films etc. for realizing thin-film transistors and other elements (described later) of a liquid crystal display device. A liquid crystal display device is constructed by interposing a liquid crystal between the thin-film transistor substrate and a color filter substrate (not shown).

Figure 2A:
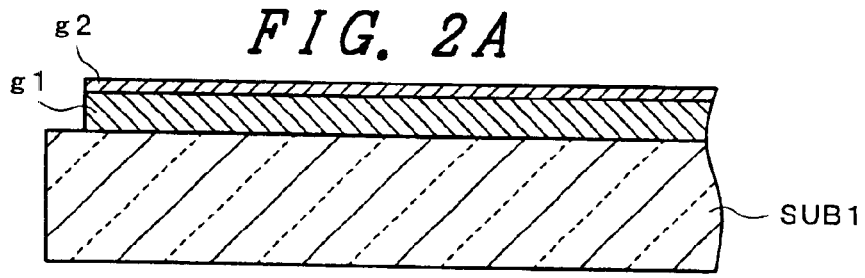
FIGS. 2A–2C are process diagrams showing how a gate line and a gate terminal are formed by a manufacturing method of a liquid crystal display device according to the first embodiment.
Figure 2B:
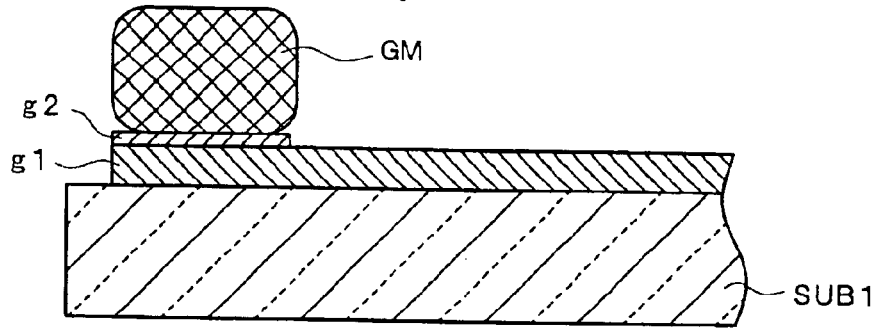
Figure 2C:
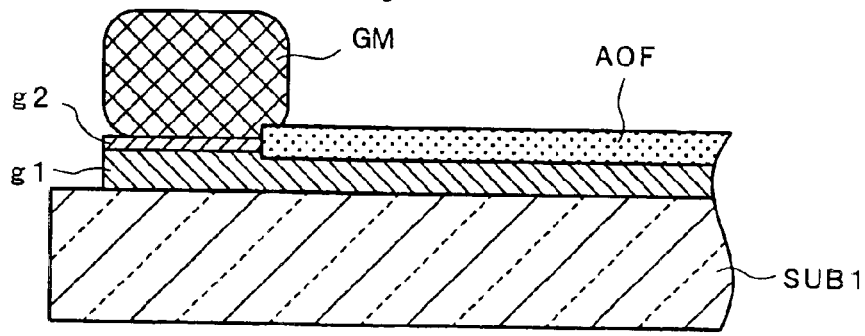

FIGS. 2A–2C are process diagrams showing how a gate line and a gate terminal are formed by a manufacturing method of a liquid crystal display device according to the first embodiment of the invention. The films etc. in FIGS. 2A–2C having the corresponding ones in FIG. 1 are given the same reference symbols as the latter. Reference symbol GM denotes an elastic member as an etching-resistant member (or an insulator).

Ethylene-propylene rubber and fluoro-rubber (e.g., a sealing material known as "Viton" (trade name)) are suitable for the material of the elastic member GM. Ethylene-propylene rubber is used in this embodiment.

An aluminum-neodymium alloy (Al—Nd alloy) thin film g1 as an aluminum alloy thin film is formed on the substrate SUB1 and a molybdenum-zirconium alloy (Mo—Zr alloy) thin film g2 as a molybdenum thin film is formed thereon successively, whereby a lamination film is formed. Gate lines and tage terminals are patterned by applying an etching process using photolithography to the lamination film (see FIG. 2A).

Then, the insulator GM is pressed against the surfaces of the molybdenum-zirconium (Mo—Zr) alloy thin films g2 of the gate terminals to mask the molybdenum-zirconium alloy thin films g2. Then, the effective displaying area (gate wiring portion) surrounded by the insulator GM on a main surface of the substrate SUB1 (the thin-film transistor substrate) is filled with an electrolytic etching liquid. A positive-pole voltage is applied to the gate line/gate terminal patterns and a negative-pole voltage is applied to the etching liquid via an electrode (not shown).

When exposed to the electrolytic etching liquid, the molybdenum-zirconium alloy thin films g2 are etched. Therefore, those portions of the molybdenum-zirconium alloy thin films g2 which are not masked by the etching-resistant member GM are resolved and removed (see FIG. 2B).

Further, those portions of the aluminum-neodymium alloy (Al—Nd alloy) thin films g1 which are exposed after the removal of the molybdenum-zirconium alloy thin films g2 are anodized by continuing to apply the positive-pole voltage to the gate line/gate terminal patterns.

As a result of the anodic oxidation, aluminum anodic oxidation films (aluminum oxide ($Al_2O_3$) films) AOF are formed on the surfaces of the respective aluminum-neodymium alloy thin films g1 (see FIG. 2C).

Then, the etching-resistant member GM is removed and the substrate is cleaned, whereby the patterns in the gate wiring portion and the gate terminal portion are obtained (see FIG. 1).

Next, the electrolytic etching and the anodic oxidation on the patterns in the gate wiring portion of the thin-film transistor substrate according to this embodiment will be described with reference to a processing apparatus (manufacturing apparatus).

Figure 3:
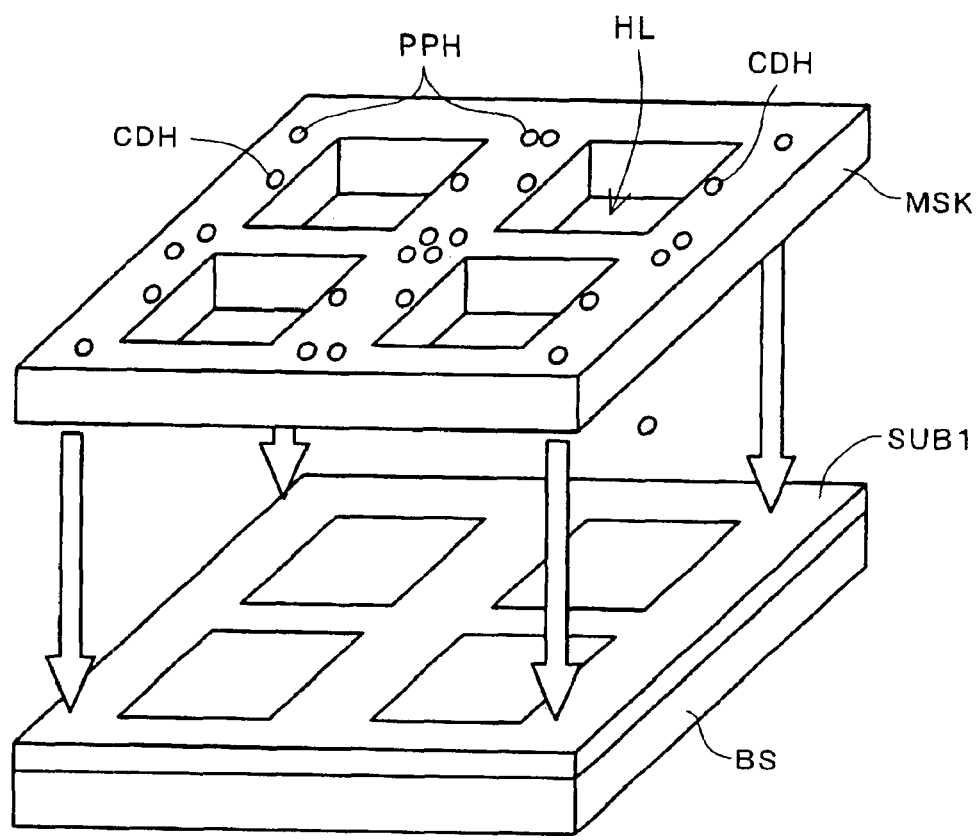
FIG. 3 is a perspective view schematically showing a general configuration of a manufacturing apparatus for a liquid crystal display device according to the first embodiment of the present invention.
Figure 4:
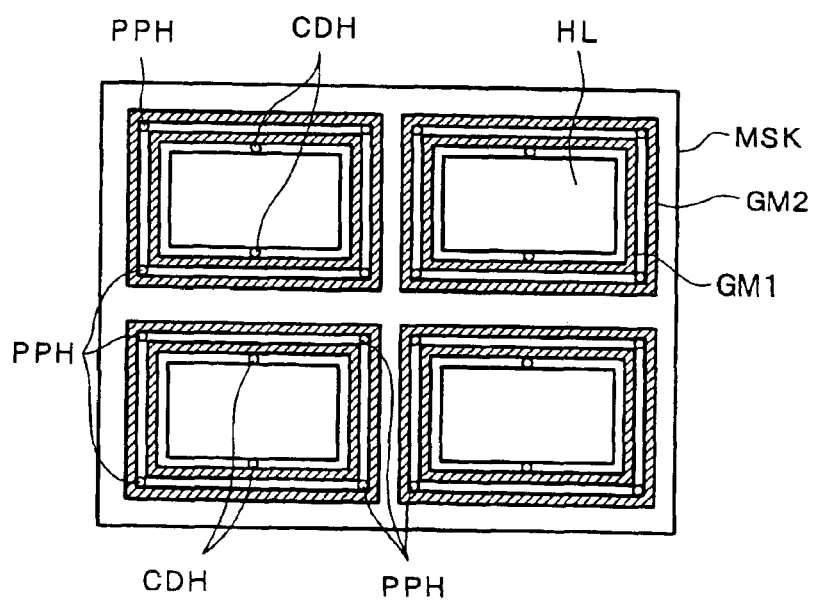
FIG. 4 is a plan view showing the structure of the inside surface of a mask plate (or, a mask board) of the manufacturing apparatus shown in FIG. 3.

FIG. 3 is a perspective view schematically showing a general configuration of a manufacturing apparatus of a liquid crystal display device according to this embodiment. FIG. 4 is a plan view showing the structure of the inside surface of a mask plate that is part of the manufacturing apparatus of FIG. 3. In FIGS. 3 and 4, reference symbol BS denotes a base plate; MSK, a mask plate; HL, openings; GM1 and GM2, etching-resistant members, CDH, an electrolyte supply holes; and PPH, electrode setting holes.

A substrate SUB1 (a thin-film transistor substrate) as a subject of processing is placed on the base plate BS and fixed to the latter by pressing the mask plate MSK against the thin-film transistor substrate from above.

Lamination structure formed of an aluminum-neodymium (Al—Nd) alloy thin film g1 as an aluminum alloy layer and a molybdenum-zirconium (Mo—Zr) alloy thin film g2 to be shaped into the gate wiring portion and the gate terminal portion is patterned on the thin-film transistor substrate SUB1. Respective end portions of the gate terminal portions at an opposite side of the effective displaying area of the substrate SUB1 are connected to each other via wiring (not shown) that will be removed by cutting off the substrate SUB1 from a mother glass.

The base plate BS and the mask plate MSK are made of a hard material that is resistant to an electrolyte, such as stainless steel, ceramics, or a rigid resin. The mask plate MSK has the rectangular openings HL that have approximately the same shape as the effective displaying areas and serve to expose the effective displaying areas. The electrolyte supply holes CDH and the electrode setting holes PPH are formed around the openings HL.

Ethylene-propylene rubber members GM1 and GM2 as the etching-resistant members made of an elastic material are attached to the back surface, that is, the surface to be opposed to the base plate BS, of the mask plate MSK so as to surround each rectangular opening HL in a concentric manner and to be brought into contact with portions outside the effective displaying area.

The mask plate MSK has the two or more electrolyte supply holes CDH between each ethylene-propylene rubber member GM1 that is closer to the periphery of the associated rectangular opening HL. In this embodiment, the electrolyte supply holes CHD are formed on the pair of longer sides of each rectangular opening HL.

The mask plate MSK has the electrode setting holes PPH between each pair of ethylene-propylene rubber members GM1 and GM2, and an electrode set to be electrically connected to the gate terminal in each of the electrode setting holes. The inside surface of each electrode setting hole PPH is formed with an insulator (not shown). Alternatively, the portions of the one electrodes which will be brought into contact with the respective electrode setting holes PPH may be coated with an insulator.

In this embodiment, the electrode setting holes PPH are formed near the corners of each rectangular opening HL. However, the electrode setting holes PPH may be formed at any positions outside the effective displaying area as long as the one electrodes to be set in the respective electrode setting holes PPH will be electrically connected to short-circuiting lines in the gate terminal portion. The number of electrode setting holes PPH may be one (the number of one electrodes is one) in the minimum case. The positions and the number of electrode setting holes PPH are determined properly in accordance with the size of a thin-film transistor substrate to be processed and the number and arrangement of rectangular holes HL formed in one mask plate MSK.

Figure 5:
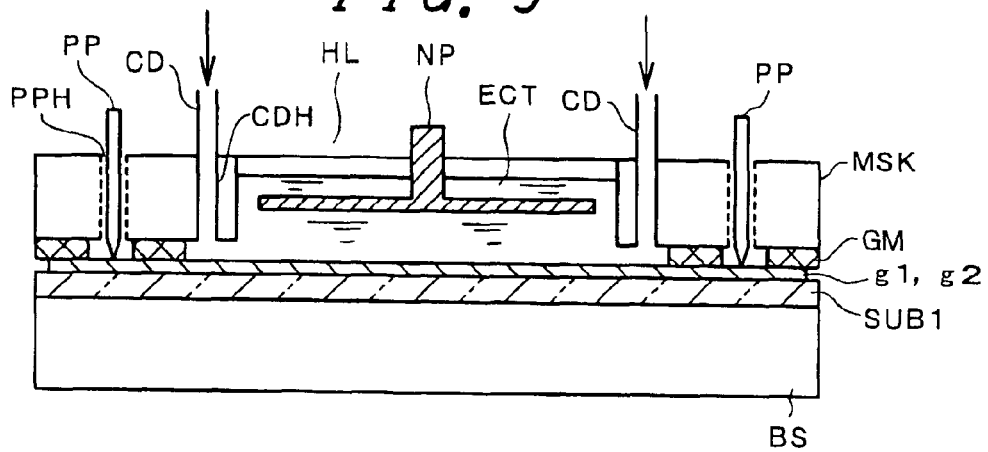
FIG. 5 illustrates how a thin-film transistor substrate is processed by using the manufacturing apparatus shown in FIG. 3.

FIG. 5 illustrates how a thin-film transistor substrate is processed by using the manufacturing apparatus of a liquid crystal display device according to this embodiment. In FIG. 5, reference symbol CD denotes electrolyte supply pipes; PP, electrodes; and NP, the other electrode to be immersed in an electrolyte ECT. The same reference symbols in FIGS. 3 and 4 denotes the same functional elements.

A method for processing a gate wiring portion using this manufacturing method is as follows. First, the thin-film transistor substrate SUB1 to be processed in placed on the base plate BS in such a manner that the surface thereof on which the aforementioned lamination film structure is patterned is up.

The mask plate MSK is pressed against the thin-film transistor substrate SUB1 from above and the pair of ethylene-propylene rubber members GM1 and GM2 as the etching-resistant members are brought into close contact with the thin-film transistor substrate SUB1. At this time, one of the electrodes PP are rendered in such a state as to be in electrical contact with short-circuiting lines in the gate terminal portion of the thin-film transistor substrate.

Each of the ethylene-propylene rubber members GM1 and GM2 may have either a rectangular or circular sectional shape. However, the circular sectional shape is desirable because it can reduce the contact area. Before or after the base plate BS is pressed against the thin-film transistor substrate SUB1, the other electrode NP is set in the rectangular opening HL in such a manner that it will be parallel with the thin-film transistor substrate in the electrolyte ECT.

Then, the electrolyte ECT is supplied to the opening HL via the electrolyte supply tubes CD. The electrolyte ECT is a solution of pH 7.0 prepared by adding aqueous ammonia to a solution of 3% tartaric acid and ethylene glycol (1:9). The electrolyte ECT is caused to overflow a groove (not shown) that is properly formed in the mask plate MSK so as to surround the opening HL so that the electrolyte ECT is prevented from coming to a standstill and uniform electrolytic etching is thereby attained.

The means for preventing the electrolyte ECT from coming to a standstill is not limited to the above. For example, one electrolyte supply tube CD is used as an input tube and the other electrolyte supply tune CD is used as an output tube so that the electrolyte ECT circulates or flow in the rectangular opening HL.

Then, a positive-pole potential is applied to the one electrodes PP and is supplied to the lamination films (g1 and g2) via the short-circuiting lines. At the same time, a negative-pole potential is applied to the other electrode NP. As a result, a constant voltage/current operation is performed.

The constant voltage is set at 40–80 V and the constant current density is set at 1 mA/cm$^2$ for a wiring area to which electrolytic etching is applied. With the application of this voltage, the upper-layer molybdenum-zirconium alloy thin films g2 of the lamination films (g1 and g2) that are in contact with the electrolyte ECT are dissolved and removed in several minutes (electrolytic etching).

By continuing to apply the voltage to the remaining lower-layer aluminum-neodymium alloy thin films g1, anodic oxidation reaction occurs at their surfaces, whereby aluminum oxide ($Al_2O_3$) films are formed on the surfaces of the respective aluminum-neodymium alloy thin films g1.

Then, the electrolyte ECT and the electrodes PP and NP are removed and the mask plate MSK are moved upward. The thin-film transistor substrate SUB1 is separated from the base plate BS and cleaned with water.

The formation of the gate lines in the effective displaying area is completed by execution of the above steps. In this manner, the gate wiring portion and the gate terminal portion can be formed by the process that includes only one photolithography step.

The above electrolytic etching and anodic oxidation process have the following three important points:

(1) The electrolytic processing of the lamination films in the effective displaying area by the electrode NP should be performed uniformly.
(2) The electrolyte ECT should be circulated sufficiently. In particular, the electrolyte ECT should be stirred or caused to flow sufficiently near the ethylene-propylene rubber members GM1 and GM2.
(3) The ethylene-propylene rubber members GM1 and GM2 should be pressed uniformly. If the pressing is not uniform, a gap may be formed between the ethylene-propylene rubber members GM1 and GM2 and the thin-film transistor substrate. As a result, the electrolyte ECT may soak into the gate terminal portion and dissolve part of the gate lines or the dissolving of the molybdenum-zirconium alloy thin films g2 in the effective display area may become insufficient, possibly causing a product failure. A method of forming a vacuum attraction hole in the base plate BS and vacuum-attracting the mask plate MSK is effective in attaining uniform pressing.

Figure 6:
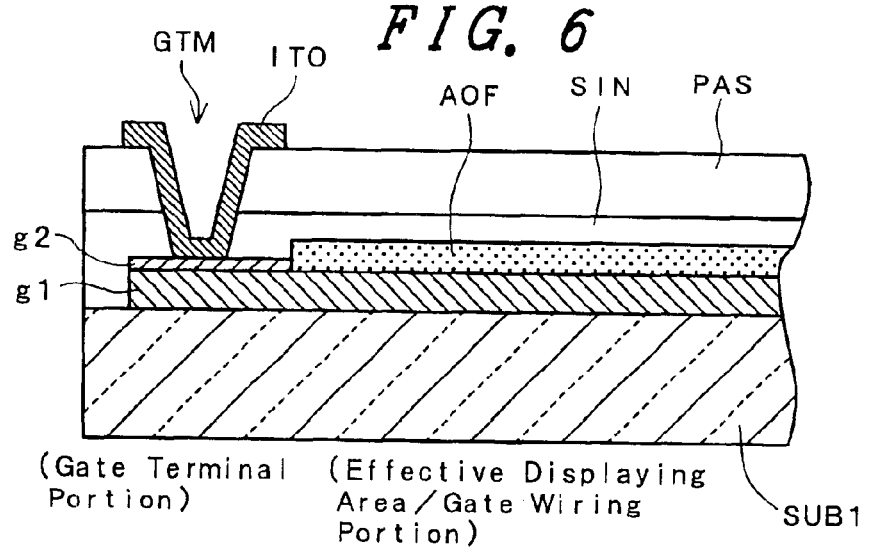
FIG. 6 is a sectional view of a gate terminal portion and an effective displaying area (gate wiring portion)
Figure 7:
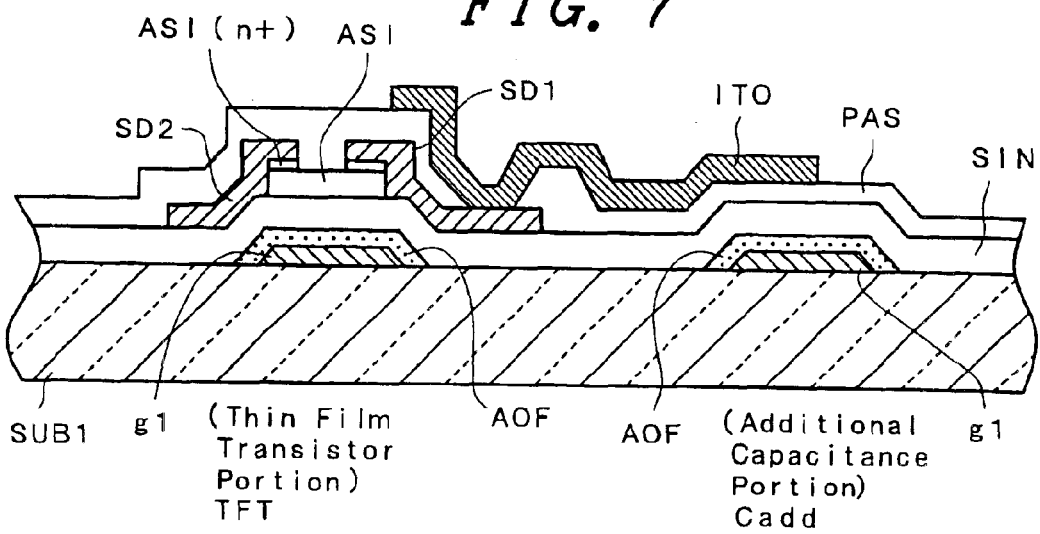
FIG. 7 is a sectional view of a thin-film transistor portion and an additional capacitance portion.
Figure 8:
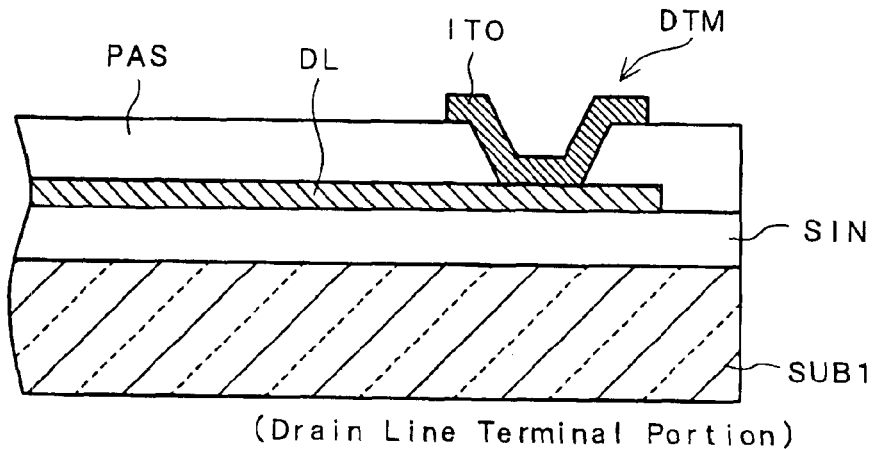
FIG. 8 is a sectional view of a drain line terminal portion.

FIGS. 6–8 are sectional views schematically showing the structure of a thin-film transistor substrate of a liquid crystal display device according to the first embodiment of the invention. FIG. 6 is a sectional view of a gate terminal portion and an effective displaying area (gate wiring portion). FIG. 7 is a sectional view of a thin-film transistor portion and an additional capacitance portion. FIG. 8 is a sectional view of a drain line terminal portion.

An insulating film SIN to become a gate insulating film, a semiconductor layer ASI to become a semiconductor layer of a thin-film transistor TFT, and an semiconductor layer ASI (n$^+$) to become contact layers are formed on the gate line and the gate terminal that were formed by the above-described processes and those films are patterned by applying an etching process using photolithography to them, whereby a structure having the cross-sections of FIGS. 6 and 7 are obtained.

Then, a drain line (signal line) DL is formed by forming a metal film with a conductive material that is the same as or equivalent to the conductive material of the gate line and then applying an etching process using photolithography to it. A passivation film PAS is formed on the drain line DL.

An opening that reaches the lamination film (g1 and g2) in the gate terminal portion is formed through the passivation film PAS and the insulating film SIN and then a transparent conductive film ITO is formed, whereby a gate terminal GTM is formed in which the lamination film (g1 and g2) is covered with the transparent conductive film ITO (see FIG. 6).

Further, openings are formed through the passivation film PAS so as to expose part of a source SD1 at a source electrode position of the thin-film transistor TFT and part of the drain line DL at a drain line terminal portion in the bottoms of the respective openings. Then, a transparent conductive film ITO is formed and an etching process using photolithography is applied thereto. Thereby, a pixel electrode ITO connected to the source SD1 is formed (see FIG. 7), and a drain line terminal DTM is formed of the transparent conductive film ITO connected to the drain line DL at the drain line terminal portion and covering the drain line (see FIG. 8). A TFT substrate is thus completed.

The pair of ethylene-propylene rubber members GM1 and GM2 have not only the function of masking the gate terminals GTM of the respective gate lines but also a function of preventing the one electrodes PP from being brought into contact with the electrolytic etching liquid ECT.

After the transparent conductive film ITO is formed and patterned into the pixel electrodes and the electrodes of the gate terminals GTM and drain terminals DTM, an alignment layer is applied to the thin film transistor substrate (the TFT substrate) and an alignment control capacity is added by rubbing or the like. The resulting TFT substrate is subjected to a subsequent process in which it is bonded to a color filter substrate.

Although in the first embodiment the invention is applied to gate lines and gate terminals, the invention can also be applied to drain lines and drain terminals of the IPS scheme or the TN scheme and counter voltage signal lines and their terminals of the IPS scheme.

According to the first embodiment, the patterning of gate lines by electrolytic etching and the formation of aluminum oxide insulating layers can be performed continuously by using the same electrolytic etching liquid. Therefore, the occurrence of display defects such as spot contaminations can be prevented by the insulating layers and the manufacturing cost can be reduced because the number of manufacturing steps does not increase.

Figure 9A:
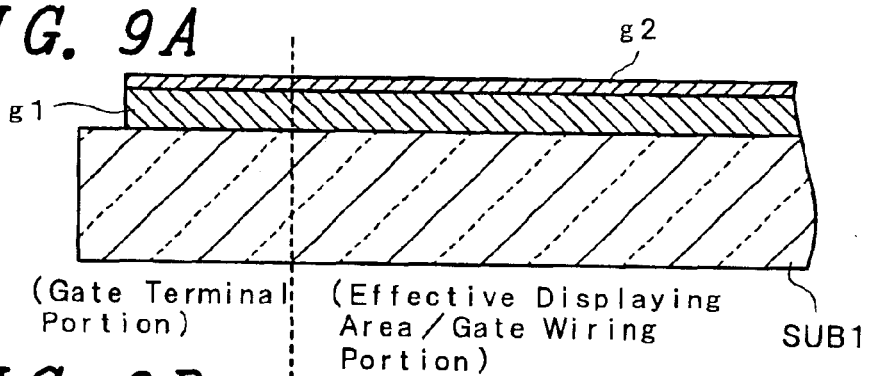
FIGS. 9A–9C show a manufacturing process of a thin-film transistor substrate of a liquid crystal display device according to a second embodiment of the invention.
Figure 9B:
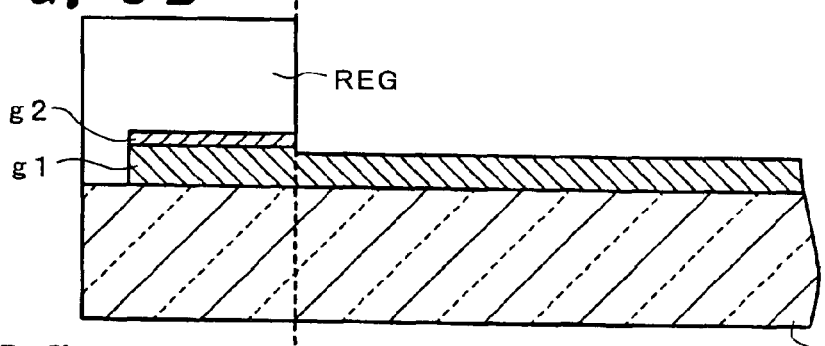
Figure 9C:
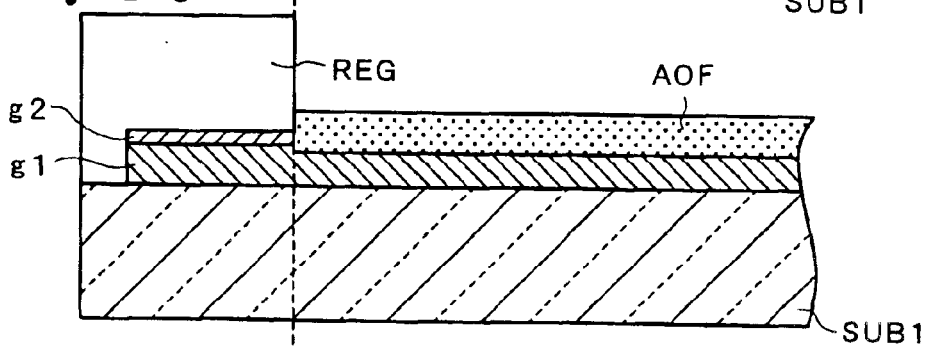

FIGS. 9A–9C show a manufacturing process of a thin-film transistor substrate of a liquid crystal display device according to a second embodiment of the invention. In this embodiment, photoresist layers are used as the etching-resistant member instead of the ethylene-propylene rubber members GM1 and GM2 that are used in the first embodiment.

First, lamination films of an aluminum-neodymium alloy thin film g1 and a molybdenum-zirconium alloy thin film g2 are formed by the same method as in the first embodiment and an etching process using photolithography is applied to the lamination films, whereby gate lines and gate terminals are formed (see FIG. 9A).

Then, a photoresist is applied, exposed to light, and developed, whereby masking photoresist layers REG are formed in the gate terminal portion (see FIG. 9B). The molybdenum-zirconium alloy thin films g2 in the effective displaying area/gate wiring portion are removed by electrolytic etching by using the manufacturing apparatus described above with reference to FIGS. 3–5, and aluminum oxide ($Al_2O_3$) films (anodic oxidation films) are formed on the surfaces of the respective aluminum-neodymium alloy thin films g1 by continuously applying a positive-pole voltage and a negative-pole voltage to the one electrodes PP and the other electrode NP, respectively (see FIG. 9C).

Then, the electrolytic etching liquid is removed and cleaning is performed in the same manner as in the first embodiment, and the masking resist layers REG are peeled off and cleaning is performed. As a result, patterns of gate terminals and gate lines that are coated with anodic oxide films are obtained.

A thin-film transistor substrate is completed by executing subsequent steps that are the same as in the first embodiment. Although in this embodiment masking is performed by using only the masking resist layers REG, etching-resistant members such as the ethylene-propylene rubber members GM1 and GM2 used in the first embodiment may be brought into contact to the masking resist layers REG.

Although in the second embodiment the invention is applied to gate lines and gate terminals, the invention can also be applied to drain lines and drain terminals of the IPS scheme or the TN scheme and counter voltage signal lines and their terminals of the IPS scheme.

Also according to the second embodiment, the patterning of gate lines by electrolytic etching and the formation of aluminum oxide insulating layers can be performed continuously by using the same electrolytic etching liquid. Therefore, the occurrence of display defects such as spot contaminations can be prevented by the insulating layers and the manufacturing cost can be reduced because the number of manufacturing steps does not increase.

When the first and second embodiments are applied to actual manufacture of a liquid crystal display device, a 30% reduction in manufacturing cost was attained. Further, the employment of aluminum-oxide-coated aluminum lines increased the yield factor by about 10%.

Next, other exemplary structures of a liquid crystal display device according to the invention will be described with reference to FIGS. 10–16.

Figure 10:
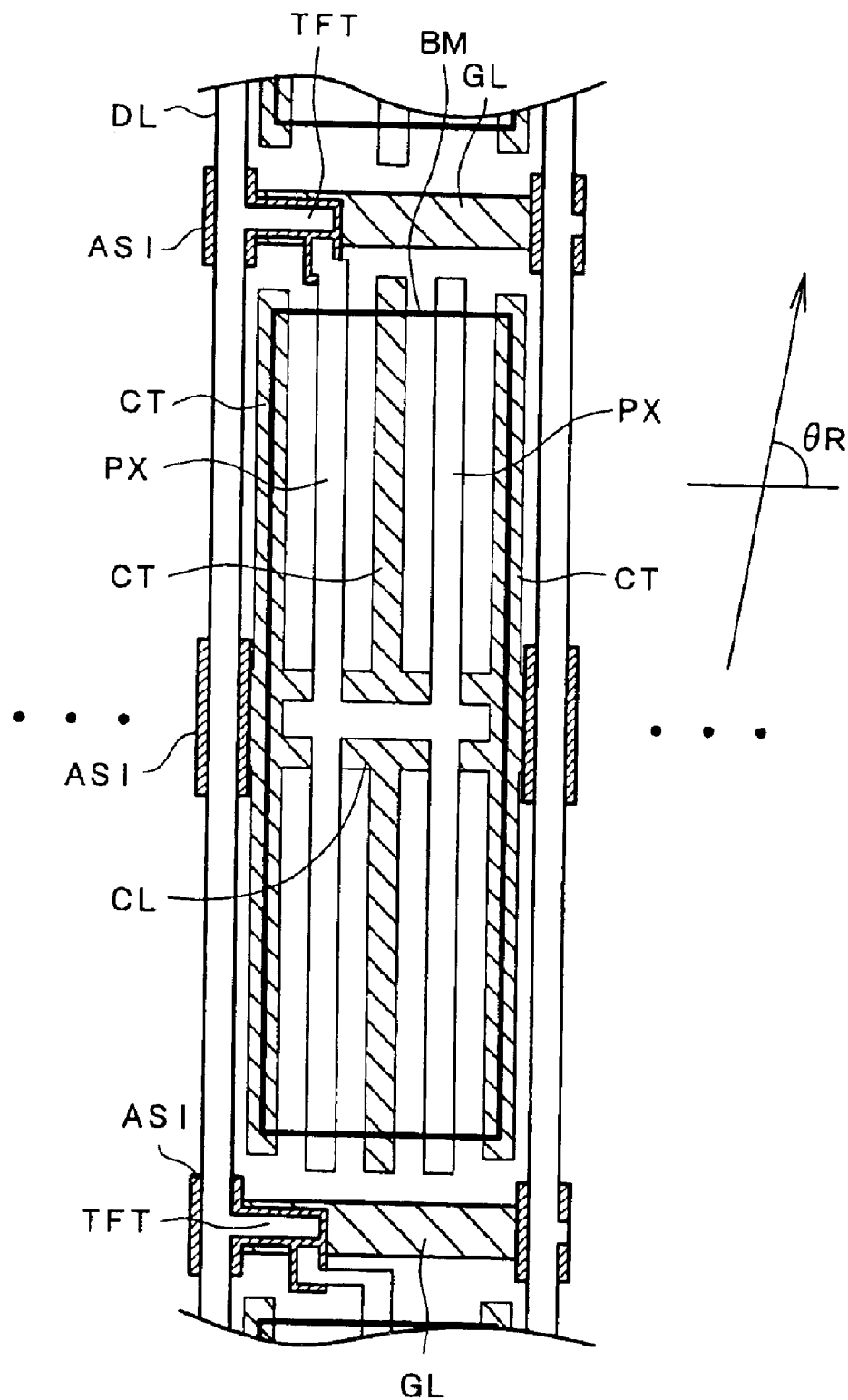
FIG. 10 is a schematic plan view of one pixel illustrating an exemplary structure of an important part of a liquid crystal display device according to the invention.

FIG. 10 is a schematic plan view of one pixel illustrating an exemplary structure of an important part of a liquid crystal display device according to the invention. A portion enclosed by a black matrix (light shield film) BM (an aperture is indicated by its inside periphery) becomes a display pixel.

A signal voltage of a drain line (video signal line) DL is transmitted to a pixel electrode PX when a thin-film transistor TFT that is formed by the drain line DL, a gate line (scanning signal line) GL, and an a-Si semiconductor film ASI is turned on, and is then held by an additional capacitance portion Cadd that is formed by a counter voltage signal line CL and the pixel electrode PX.

Liquid crystal portions between the pixel electrode PX and counter electrodes CT are driven by a signal that is held by the additional capacitance portion Cadd.

The counter voltage signal line CL is located approximately at the center of the aperture (pixel region) of the black matrix BM and the liquid crystal has an initial alignment angle $\theta R$ with respect to the counter voltage signal line CL. In general, the initial alignment angle $\theta R$ is 60° to 90°.

Figure 11:
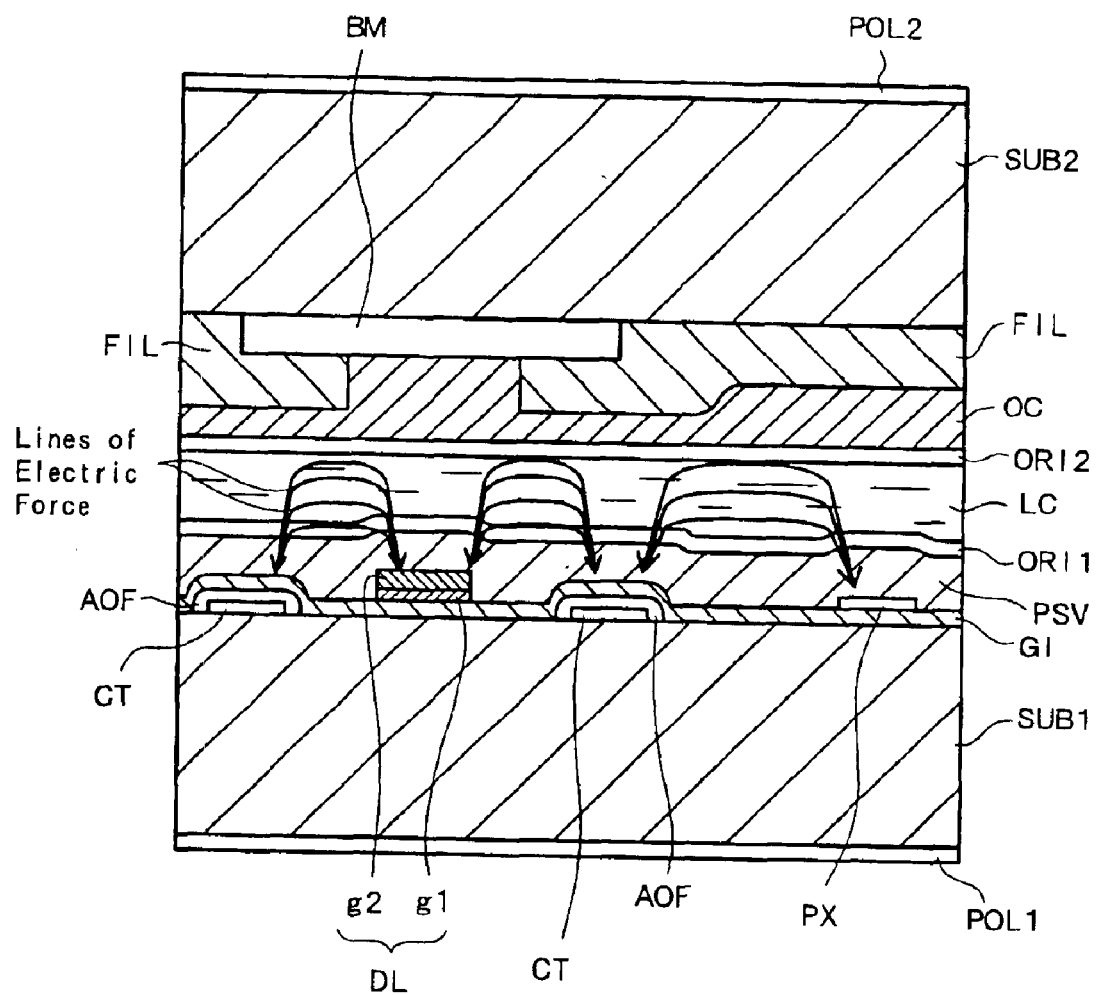
FIG. 11 is a sectional view of an important part of a liquid crystal display device of the lateral electric field scheme illustrating electric fields formed therein.

FIG. 11 is a sectional view of an important part of a liquid crystal display device of the lateral electric field scheme illustrating electric fields formed therein. As for a thin-film transistor substrate of this liquid crystal display device, drain lines (video signal lines) DL, counter electrodes CT, and pixel electrodes PX are formed on a substrate SUB1 and an alignment control layer ORI1 is formed at the interface between a liquid crystal LC and a passivation film PSV that is formed on the drain lines DL, the counter electrodes CT, and the pixel electrodes PX. As for a color filter substrate, color filters FIL that are divided by a black matrix BM are formed on another substrate SUB2. An overcoat layer OC is formed on the color filters FIL and the black matrix BM to prevent their materials from influencing the liquid crystal LC, and an alignment control layer ORI2 is formed at the interface between the overcoat layer OC and the liquid crystal LC.

Each of the drain lines DL formed on the thin-film transistor substrate SUB1 consists of a conductive film (aluminum alloy thin film) g1 and a conductive film (molybdenum alloy thin film) g2.

It is a common technique to set the distance between the thin-film transistor substrate SUB1 and the color filter substrate SUB2 (i.e., the cell gap that is equal to the thickness of the liquid crystal layer) at a prescribed value by disposing spherical or pole-shaped spacers (not shown) between the two substrates. Polarizers POL1 and POL2 are disposed outside the respective substrates SUB1 and SUB2.

Figure 12:
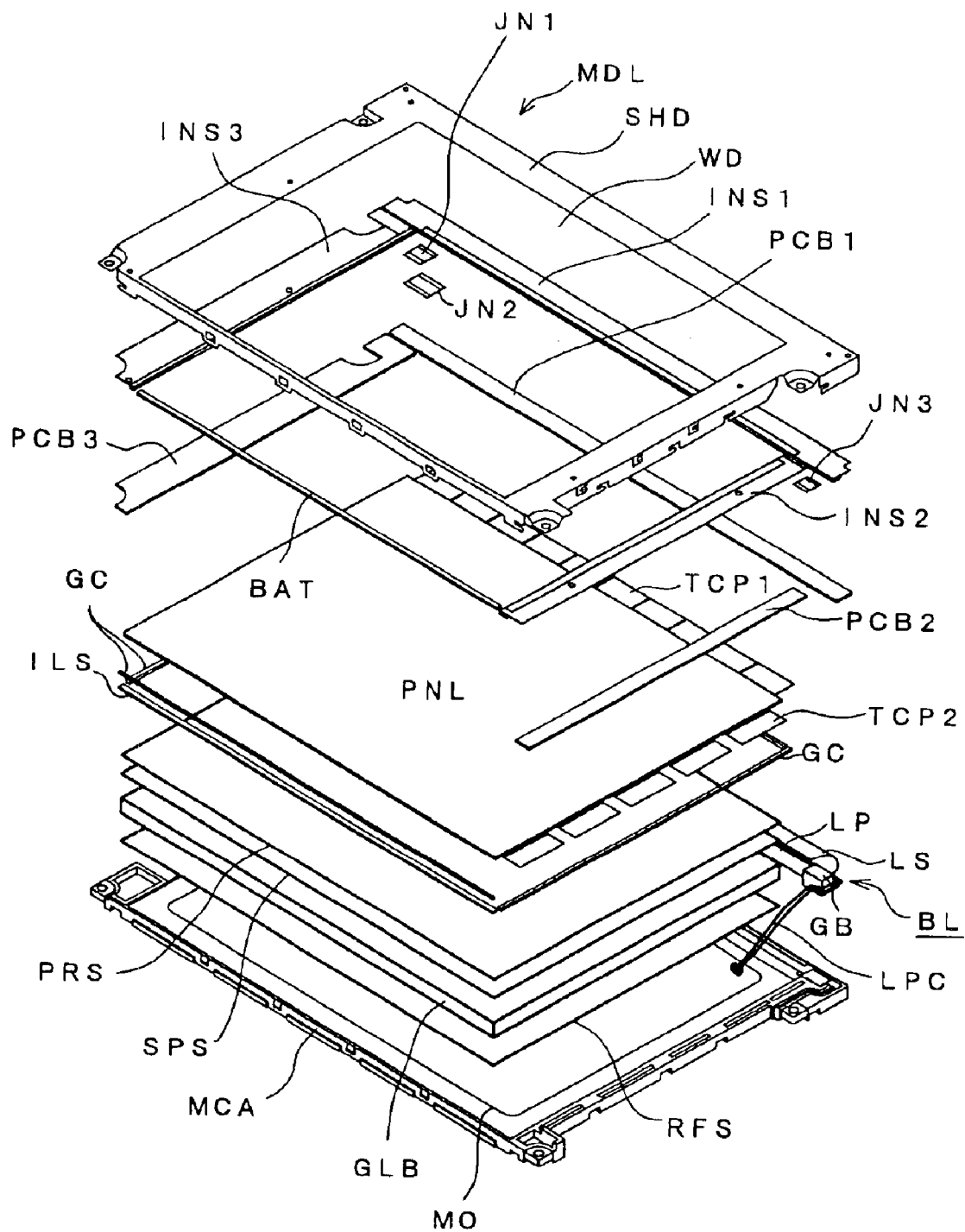
FIG. 12 is an exploded perspective view showing the entire configuration of a liquid crystal display device according to the invention.

FIG. 12 is a developed perspective view for explaining an overall constitution of the liquid crystal display device according to the invention, and a concrete structure of the liquid crystal display device (hereinafter, called a liquid crystal display module: MDL, into which a liquid crystal display panel formed of a pair of substrates SUB1, SUB2 bonded together, driving means, backlight, and any other constituent member are integrated) will be explained thereby.

In the drawing, SHD indicates a shield casing formed of a metal plate (also called a metal frame) SHD, WD indicates a display window, INS 1–3 indicate insulating sheets, PCB 1–3 indicate circuit boards constituting the driving means (PCB 1 being a drain-side circuit board: a driver circuit board for video signal lines, PCB 2 being a gate-side circuit board, PCB 3 being an interface circuit board), JN 1–3 indicate joiners for electrically connecting circuit boards PCB 1–3, TCP1 and TCP2 indicate tape carrier packages, PNL indicates a liquid crystal panel, GC indicates a rubber cushion, and ILS indicates a light shielding spacer, respectively. Moreover, PRS indicates a prism sheet, SPS indicates a diffusion sheet, GLB indicates a light guide plate, RFS indicates a reflection sheet, MCA indicates a lower casing (mold frame) which is formed by integral molding, MO is an opening of the MCA, LP indicates a fluorescent tube (a lamp), LPC indicates a lamp cable, GB indicates a rubber bushing for supporting the fluorescent tube LP, BAT indicates a double-sided adhesive tape, BL indicates a backlight BL constituting of the light guide plate, the linear lamp and the like, respectively. The liquid crystal display module MDL is assembled by laminating diffusion plate members in the arrangement relationship shown in the drawing.

The liquid crystal display module MDL includes two kinds of accommodating/holding members consisting of the lower casing MCA and the shielding casing SHD. The metal-made shield casing SHD which accommodates and fixes the insulation sheets INS 1–3, the circuit boards PCB 1–3 and the liquid crystal panel PNL and the lower casing MCA which accommodates the backlight BL consisting of the fluorescent tube LP, the light guide plate GLB, the prism sheet PRS and the like are integrally merged into the liquid crystal display module MDL.

On the video signal line driving circuit board PCB1, an integrated circuit chip for driving each of pixels of the liquid crystal display panel PNL is mounted. On the interface circuit board PCB 3, an integrated circuit chip which receives video signals from an external host computer and receives control signals such as timing signals or the like and a timing converter TCON which generates clock signals by processing timing, and the like are mounted.

A clock signal generated by the timing converter is supplied to the integrated circuit chip mounted on the video signal line driving circuit board PCB1 via clock signal lines CLL laid at the interface circuit substrate PCB3 and the video signal line driving circuit board PCB1.

The interface circuit board PCB 3 and the video signal line driving circuit board PCB1 are multi-layered wiring boards, and the clock signal lines CLL are formed as inner-layered wiring of the interface circuit board PCB 3 and the video signal line driving circuit board PCB1.

Meanwhile, the drain-side circuit board PCB1 for driving TFT, the gate-side circuit board PCB2, and the interface circuit board PCB3 are connected to the liquid crystal panel PNL by tape carrier packages TCP1, TCP2, and the circuit boards PCB1, PCB2, PCB3 are connected to each other by joiners JN1, JN2, JN3.

The liquid crystal panel is the previously mentioned active matrix type liquid crystal display device of the lateral electric scheme to which the present invention is applied, the wiring/electrodes on the thin film transistor substrate thereof have structures formed by the manufacturing apparatus and the fabrication method explained in the preceding embodiments.

Figure 13:
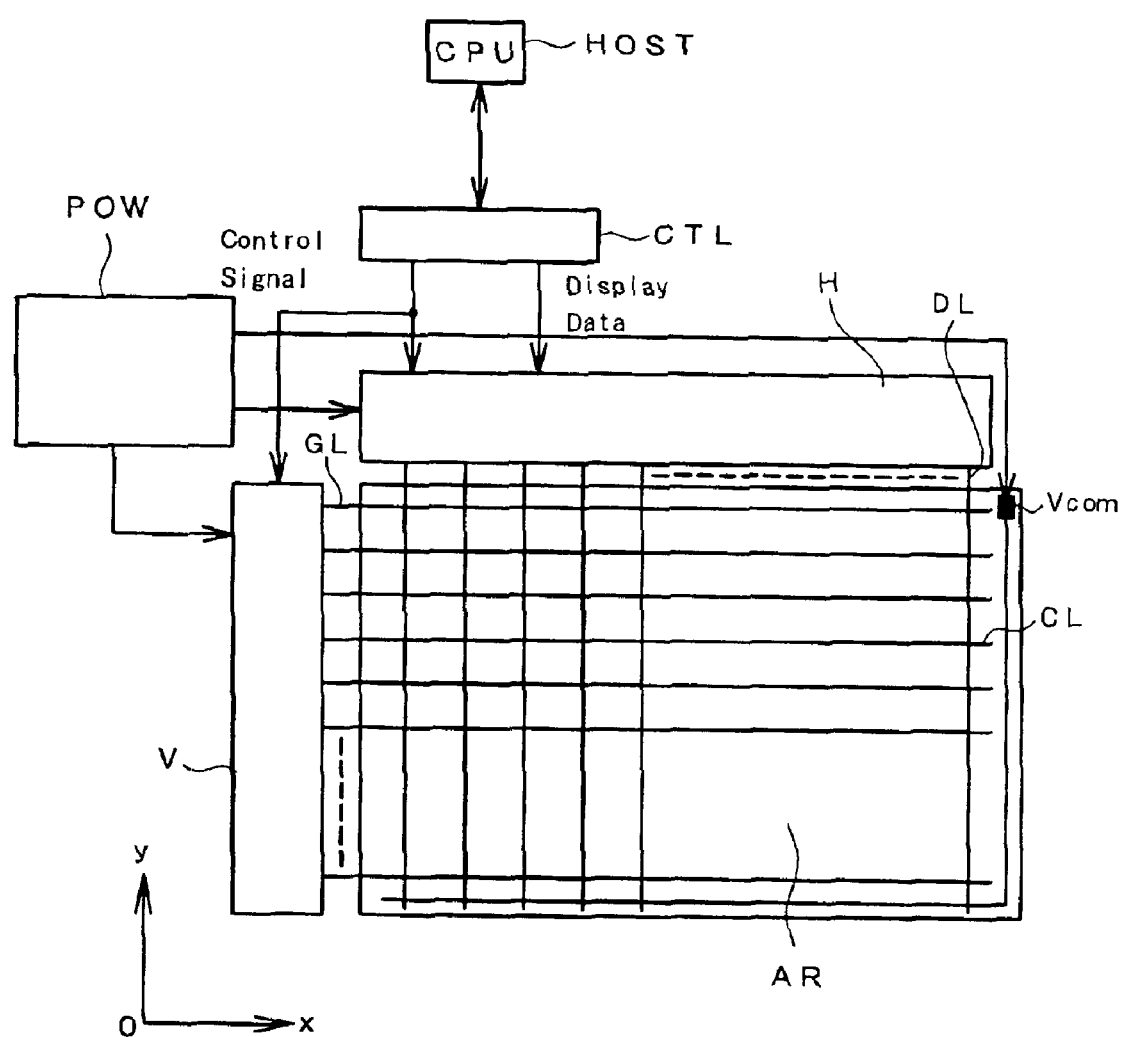
FIG. 13 is an equivalent circuit diagram of a liquid crystal display device according to the invention.

FIG. 13 is an explanatory view of an equivalent circuit of the liquid crystal display device according to the present invention. As FIG. 13 shows, a display area of a liquid crystal panel constituting the liquid crystal display device is formed of an ensemble of a plurality of pixels being arranged in a matrix manner, and each of the pixels is formed so as to modulate and to control transmitted light from the backlight disposed at a rear side of the liquid crystal panel, individually.

On a TFT substrate SUB1 as one of constituent elements of the liquid crystal panel, gate lines GL and common lines CL are formed to be extended in the x-direction (row direction) and to be juxtaposed in the y-direction (column direction) in an effective pixel area AR thereof, and drain lines DL are formed to be extended in the y-direction and to be juxtaposed in the x-direction (column direction) in the effective pixel area AR thereof. The gate lines GL and the common lines CL are formed after one of the structures previously mentioned in the embodiments. A unit pixel is formed in each of rectangular areas surrounded by the gate lines GL and the drain lines DL.

The liquid crystal display device is provided with a vertical scanning circuit V and a video signal driver circuit H as external circuits thereto. Scanning signals (voltages) are sequentially supplied to the respective gate lines GL by the vertical scanning circuit V, and video signals (voltages) are supplied to the respective drain lines DL from the video signal driver circuit H in accordance with the timing of supply of the scanning signals.

Incidentally, the vertical scanning circuit V and the video signal driver circuit H are supplied with electric power from a liquid crystal driving power source POW, and a controller CTL divides the image (video) information inputted from a host CPU such as a personal computer, a television receiving circuits, or the like into display data and a control signal, and inputs them to the vertical scanning circuit V and the video signal driver circuit H.

FIGS. 14A to 14F are diagrams of driving waveforms of the liquid crystal display device to which the invention is applied. The counter voltage is formed as an alternating rectangular pulse wave having two values VCH and VCL, and the non-selecting voltage of each of scanning signals VG(i-1) and VG(i) is varied between the two values VCH and VCL every scanning period. The amplitude width of the counter voltage and that of the non-selecting voltage are made the same.

The video signal voltage is a voltage obtained by subtracting ½ of the amplitude of the counter voltage from a voltage to be applied to the liquid crystal layer.

The counter voltage may also be a direct current voltage, but by alternating the video signal voltage, it is possible to decrease the maximum amplitude of the video signal voltage and therefore, it is possible to use a circuit having a low breakdown voltage as the video signal driver circuit (signal-side driver).

Figure 15:
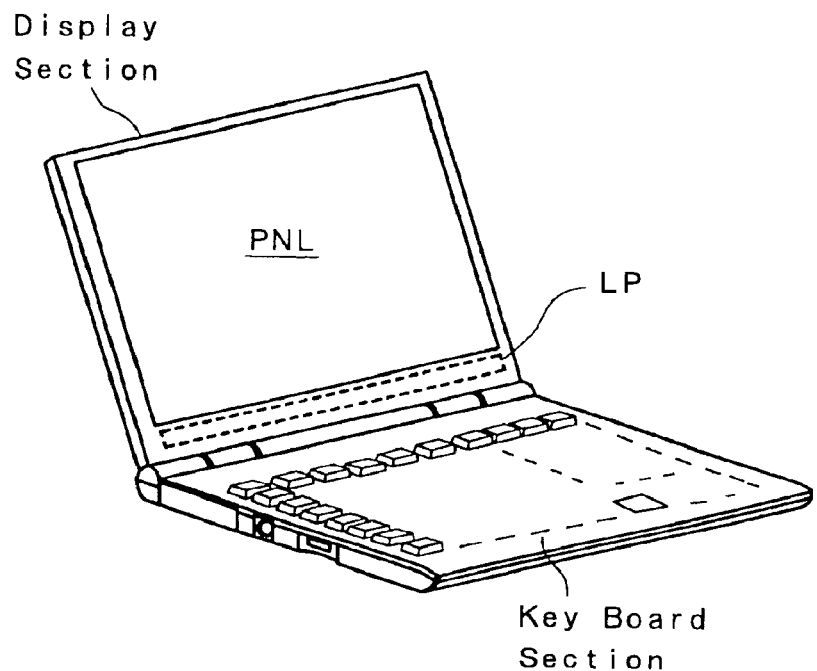
FIG. 15 shows an appearance of an exemplary notebook-sized personal computer incorporating a liquid crystal display device according to the invention.

FIG. 15 is an appearance view showing an example of a notebook type personal computer on which the liquid crystal display device of the invention is mounted. A liquid crystal display device according to the present invention is mounted on a display part of the notebook type personal computer. LP indicates is a linear lamp LP provided on the display part.

Figure 16:
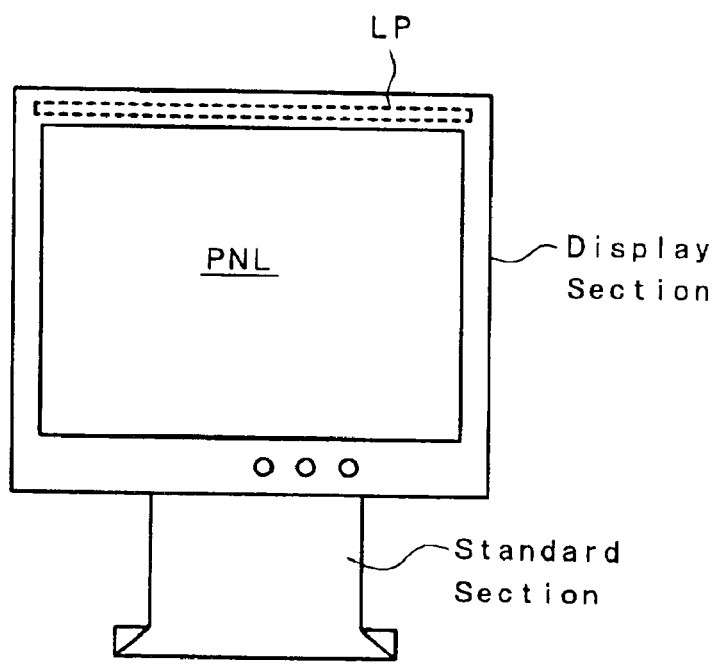
FIG. 16 shows an appearance of an exemplary desk-top monitor incorporating a liquid crystal display device according to the invention.

FIG. 16 is an appearance view showing an example of a desktop type personal computer on which the liquid crystal display device of the invention is mounted. A liquid crystal display device according to the present invention is mounted on a display part of the monitor. Moreover, LP indicates a linear lamp LP.

It is needless to say that the liquid crystal display device according to the invention can be used as a display device of the notebook type personal computer, the desktop type monitor and other equipment shown in FIGS. 11 and 12.

As explained above, the gate wiring portions and the gate terminal portions of the liquid crystal display device are formed by patterning the laminated film structures provided commonly and by processing them with the electrolytic etching and the anodic oxidation successively without any photolithography process in accordance with the present invention, so that the high-performance thin film transistor type liquid crystal display device can be provided with manufacturing cost thereof and display failure therein suppressed.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A method for manufacturing a liquid crystal display device having an insulating substrate which has a region utilized for an effective displaying area being formed in a main surface of the insulating substrate and comprises a plurality of gate lines, a plurality of signal lines, a plurality of thin film transistors, and a plurality of pixel electrodes each formed in the effective displaying area on the main surface, wherein each of the plurality of signal lines intersects the plurality of gate lines thereon, each of the plurality of thin film transistors is provided at an intersection of one of the plurality of gate lines and one of the plurality of signal lines, and each of the plurality of pixel electrodes is electrically connected to one of the plurality of thin film transistors, the method comprising the following steps in order:

a first step for providing a laminated structure of an aluminum alloy layer and a molybdenum alloy layer stacked on the aluminum alloy layer by forming an aluminum alloy film and a molybdenum alloy film in this order on the insulating substrate;

a second step for shaping the plurality of gate lines in the effective displaying area and respective gate terminal portions corresponding thereto in a periphery of the effective displaying area by patterning the laminated structure of the aluminum alloy layer and the molybdenum alloy layer;

a third step for covering the periphery of the effective displaying area including at least the gate terminal portions on the insulating substrate with an anti-etching member and keeping the effective displaying area including at least the plurality of gate lines not covered with the anti-etching member;

a fourth step for immersing the insulating substrate having the periphery of the effective displaying area covered with the anti-etching member into electrolytic solution in which an electrode is disposed so as to contact the laminated structure formed in the effective displaying area including at least the plurality of gate lines with the electrolytic solution; and a fifth step for removing the electrolytic solution and the anti-etching member from the insulating substrate after the fourth step is finished and cleaning the insulating substrate;

wherein the molybdenum alloy layer of the laminated structure including each of the plurality of gate lines in contact with the electrolytic solution is removed from the aluminum alloy layer thereof and an aluminum oxide film is formed on a surface of the aluminum alloy layer thereof by anodic oxidation of the surface of the aluminum alloy layer after the removal of the molybdenum alloy layer thereof during the fourth step, and wherein the removal of the molybdenum alloy layer of each of the plurality of gate lines and the anodic oxidation of the aluminum alloy layer of each of the plurality of gate lines are finished during the fourth step.

2. A method according to claim 1, further comprising, during said fourth step, applying a positive-pole voltage to the laminated structure including at least the plurality of gate lines in contact with the electrolytic solution and a negative-pole voltage to the electrode disposed in the electrolytic solution.

3. A method for manufacturing the liquid crystal display device according to claim 1, wherein the anti-etching member is formed of an elastic material.

4. A method for manufacturing the liquid crystal display device according to claim 3, wherein the elastic material is either ethylene-propylene rubber or fluoro-rubber.

5. A method for manufacturing the liquid crystal display device according to claim 1, wherein the anti-etching member is formed of a photoresist material.

6. A method for manufacturing the liquid crystal display device according to claim 1, wherein the aluminum alloy layer is formed of an alloy including aluminum and at least one of titanium, tantalum, and neodymium added thereto, and the molybdenum alloy layer is formed of an alloy including molybdenum and at least one of chromium, zirconium, and hafnium added thereto.

7. A method for manufacturing the liquid crystal display device according to claim 1, wherein a constant current flows between the laminated structure including each of the plurality of gate lines in contact with the electrolytic solution and the electrode disposed in the electrolytic solution under a constant voltage applied therebetween in the fourth step.

8. A method for manufacturing the liquid crystal display device according to claim 7, wherein the constant voltage applied between the laminated structure including each of the plurality of gate lines in contact with the electrolytic solution and the electrode disposed in the electrolytic solution in the fourth step is in a range between 40V and 80V.

9. A method for manufacturing the liquid crystal display device according to claim 1, wherein the electrolytic solution is a solution of tartaric acid and ethylene glycol to which aqueous ammonia is added.

10. A method for manufacturing the liquid crystal display device according to claim 2, wherein the anti-etching member is formed of an elastic material.

11. A method for manufacturing the liquid crystal display device according to claim 10, wherein the elastic material is either ethylene-propylene rubber or fluoro-rubber.

12. A method for manufacturing the liquid crystal display device according to claim 2, wherein the anti-etching member is formed of a photoresist material.

13. A method for manufacturing the liquid crystal display device according to claim 2, wherein the aluminum alloy layer is formed of an alloy including aluminum and at least one of titanium, tantalum, and neodymium added thereto, and the molybdenum alloy layer is formed of an alloy including molybdenum and at least one of chromium, zirconium, and hafnium added thereto.

14. A method for manufacturing the liquid crystal display device according to claim 2, wherein a constant current flows between the laminated structure including each of the plurality of gate lines in contact with the electrolytic solution and the electrode disposed in the electrolytic solution under a constant voltage applied therebetween in the fourth step.

15. A method for manufacturing the liquid crystal display device according to claim 14, wherein the constant voltage applied between the laminated structure including each of the plurality of gate lines in contact with the electrolytic solution and the electrode disposed in the electrolytic solution in the fourth step is in a range between 40V and 80V.

16. A method for manufacturing the liquid crystal display device according to claim 2, wherein the electrolytic solution is a solution of tartaric acid and ethylene glycol to which aqueous ammonia is added.

17. A method for manufacturing the liquid crystal display device according to claim 1, wherein the patterning of the laminated structure in the second step is done using a photolithographic technique.

* * * * *